United States Patent
Tang et al.

(10) Patent No.: US 12,287,448 B2
(45) Date of Patent: Apr. 29, 2025

(54) FIVE-POINT DECONVOLUTION INTERPRETATION METHOD FOR QUANTIFICATION OF URANIUM ORES BY GAMMA SPECTRUM LOGGING

(71) Applicant: East China University of Technology, Jiangxi (CN)

(72) Inventors: Bin Tang, Jiangxi (CN); Xiongjie Zhang, Jiangxi (CN); Haitao Wang, Jiangxi (CN); Zhifeng Liu, Jiangxi (CN); Yan Zhang, Jiangxi (CN); Renbo Wang, Jiangxi (CN); Lijiao Zhang, Jiangxi (CN); Rui Chen, Jiangxi (CN); Fan Huang, Jiangxi (CN); Shumin Zhou, Jiangxi (CN); Jinhui Qu, Jiangxi (CN)

( * ) Notice: Subject to any disclaimer, the term of this patent is extended or adjusted under 35 U.S.C. 154(b) by 387 days.

(21) Appl. No.: 17/835,642

(22) Filed: Jun. 8, 2022

(65) Prior Publication Data
US 2023/0228906 A1  Jul. 20, 2023

(30) Foreign Application Priority Data
Jan. 18, 2022 (CN) .......................... 202210054227.9

(51) Int. Cl.
*G01V 5/06* (2006.01)
(52) U.S. Cl.
CPC ..................................... *G01V 5/06* (2013.01)
(58) Field of Classification Search
CPC ........... G01V 5/06; G01V 5/281; Y02E 30/30
See application file for complete search history.

(56) References Cited

U.S. PATENT DOCUMENTS

| | | | |
|---|---|---|---|
| 3,976,878 A * | 8/1976 | Chevalier | G01V 5/06 250/363.01 |
| 4,475,038 A * | 10/1984 | Lochmann | G01V 5/101 250/269.6 |
| 4,529,877 A * | 7/1985 | Arnold | G01V 5/06 250/266 |
| 5,120,955 A * | 6/1992 | Galford | G01V 5/06 250/262 |
| 2007/0284518 A1* | 12/2007 | Randall | G01V 5/12 250/261 |
| 2017/0275982 A1* | 9/2017 | Peyaud | E21B 47/002 |
| 2018/0136360 A1* | 5/2018 | Ardjmandpour | G01V 5/06 |
| 2019/0086576 A1* | 3/2019 | Inanc | G01V 5/04 |
| 2023/0142227 A1* | 5/2023 | AlQatari | G01V 5/06 702/8 |

* cited by examiner

*Primary Examiner* — Yoshihisa Ishizuka

(57) ABSTRACT

A five-point deconvolution method for quantification of uranium ores by energy spectrum logging disclosed by the invention refers to: carry out γ spectrum logging along the borehole to obtain logging curves in multiple energy zones, using these logging curves and energy spectrum features, inversion calculate the distribution of uranium content along the borehole; the main features are: first, realize the subdivision interpretation of layered strata; second, realize multi-element stripping for energy spectrum logging; third, realize subdivision interpretation by the five-point deconvolution methods; fourth, on-site uranium ores quantification under fast spectral logging conditions can be realized; the invention also discloses two types of algorithm flows of "first stripping, then subdividing" and "first subdividing, then stripping" and the formula for solving the uranium/thorium/potassium content of the unit layer.

3 Claims, 13 Drawing Sheets

A: Uranium characteristic spectrum 1 (≤1.35MeV)
B: Uranium characteristic spectrum 2 (≤2.00MeV)
C: Uranium characteristic spectrum 3 (≤2.30MeV)
D: Potassium characteristic spectrum (≤1.55MeV)
E: Thorium characteristic spectrum 1 (≤1.70MeV)
F: Thorium characteristic spectrum 2 (≤2.80MeV)

FIVE-POINT DECONVOLUTION INTERPRETATION METHOD FOR QUANTIFICATION OF URANIUM ORES BY GAMMA SPECTRUM LOGGING

1. TECHNICAL FIELD

The invention relates to the technical field of nuclear logging, in particular to a five-point deconvolution interpretation method for quantification of uranium ores by γ spectrum logging.

2. BACKGROUND ART

Nuclear logging is a cutting-edge technology that has developed rapidly with the development of contemporary science and technology and its application in the field of mineral exploration. It is a non-destructive detection method that uses the naturally generated or artificially induced radioactive rays of the strata rock to determine whether there are certain nuclides or elements in the strata by studying the distribution law of the rays along the borehole, and to determine their content distribution. In the field of oil and gas exploration, nuclear logging has formed corresponding well exploration methods in the aspects of dividing strata, determining lithology, finding oil-water interface, determining oil saturation, calculating strata porosity, and determining rock density. Existing nuclear logging includes natural γ logging, γ-γ logging, pulsed neutron-γ spectrum logging, pulsed neutron-thermal neutron logging, etc.

Natural γ logging is the earliest nuclear logging technology, including γ total logging and γ spectral logging. Natural γ logging used for uranium exploration and uranium quantification, is commonly known as uranium γ logging, or γ logging for short. Uranium ore γ logging is closely related to the three radioactive elements of uranium/thorium/potassium, and shoulders the important task of quantifying uranium ores such as searching for uranium ores in wells, delineating the boundaries of ore bodies, and determining the content of ore layers. The γ logging referred in "Specifications for Uranium Mineral Exploration" and "γ Logging Specifications" of China is the product of the combination of γ logging technology and uranium ore quantitative methods, in which the quantitative method of uranium ore combines advanced data processing technology. "γ Logging Specification" recommends the use of three-point or five-point deconvolution method, successive iteration method and other subdivision interpretation methods of γ total logging to realize uranium ore quantification, which has made China uranium ore become the only mineral that can submit mineral reserves without chemical analysis of rock samples.

Conventional mineral quantification methods are mainly realized by core sampling and chemical analysis of rock samples, which have the disadvantages of low efficiency, long cycle and high cost. In the field of uranium exploration and in-situ leaching of uranium, uranium quantification methods and advanced technologies that integrate nuclear logging are being developed. For example, the quantitative method of uranium ore that integrates γ total logging and subdivision interpretation has been popularized and applied in the whole uranium ore industry. In theory, γ spectroscopy logging should be more advantageous. It can measure the γ-ray naturally produced in the strata rock in the borehole, and strip out the interference of thorium/potassium or its energy spectrum to the uranium ore quantification, and it is expected to become a more advanced uranium ore quantification method. However, the existing instruments and equipment for γ spectroscopy logging, especially the related uranium ore quantitative algorithms are insufficient. Compared with uranium ore γ total volume logging, uranium ore γ energy spectrum logging has the advantages of slow logging speed and many interference factors. And it is not integrated with the subdivision interpretation, resulting in the lack of popularization and application of γ energy spectrum logging in uranium ores, and it does not reflect the advanced nature of energy spectrum logging.

3. SUMMARY OF THE INVENTION

The invention intends to solve the two major problems of subdivision interpretation, energy spectrum stripping or element stripping faced by energy spectrum logging uranium ore quantitative methods, and aims to achieve fast energy spectrum logging. For layered uranium ores or layered strata formed by radioactive elements such as uranium/thorium/potassium, develop a five-point (formula) deconvolution method for γ energy spectrum logging that can achieve quantitative uranium ore. This method is commonly known as energy spectrum logging five-point deconvolution method, or five-point deconvolution method for short, and has three characteristics: subdivision interpretation, element stripping or energy spectrum stripping, and fast logging, specifically:

The subdivision interpretation is to subdivide the strata into several thin layers of equal thickness, which are called unit layers, and the thickness of the unit layer is the same as the distance between the logging points. Solving for the content of elements such as uranium/thorium/potassium for each unit layer is called subdivision interpretation. The quantitative method of uranium ore realized according to the viewpoint of subdivision interpretation is called subdivision interpretation method, referred to as subdivision method, which is an advanced method of uranium ore quantification.

The five-point deconvolution method is a subdivision interpretation using the data of five adjacent measuring points of the γ energy spectrum logging curve, through signal transstrata and deconvolution algorithm, to construct a method to calculate the content of radioactive elements such as uranium/thorium/potassium in the unit layer. The method only needs to move the positions of five adjacent measuring points in sequence, and then the contents of radioactive elements such as uranium/thorium/potassium at all measuring points along the borehole or in each unit layer can be obtained, which is a real-time quantitative interpretation method of uranium ore.

The energy spectrum stripping or element stripping refers to stripping the γ energy spectrum log curves generated by radioactive elements such as uranium/thorium/potassium from the γ energy spectrum logging curve, or directly stripping radioactive elements such as uranium/thorium/potassium from the unit layer. The quantitative method of uranium ore realized from the viewpoint of element stripping or energy spectrum stripping is called stripping interpretation method, or stripping method for short.

The quasi-full spectrum analysis method is an improvement on the characteristic peak analysis method and the full spectrum analysis method, making it an element stripping method suitable for fast energy spectrum logging. The characteristic peak analysis method only uses the main characteristic peaks of γ-rays, and even only takes one characteristic peak in each of uranium/thorium/potassium elements, so the count rate is low, and long-term measurement is required to improve the analytical precision; the full spectrum analysis method makes full use of the subtle variation data of the full spectrum, and is suitable for laboratory analysis of small rock samples, which is an advanced analytical method that improves the analytical accuracy by fitting the measured energy spectrum to the standard energy spectrum. The γ-rays of uranium ore energy spectrum logging come from "large" stratas rather than "small" rock samples, and there are many interference factors, so there must be enough count rates to ensure high-speed logging. Both the full spectrum analysis method and the characteristic peak analysis method are difficult to be practical. The quasi-full spectrum analysis method neither uses the full spectrum nor relies on the main characteristic peaks of γ-rays, but reasonably selects multiple energy zones that can reflect both the full spectrum variation law and the response of the characteristic peaks, whose number is higher than the number of elements to be stripped. It is an element stripping analysis method suitable for fast energy spectrum logging, which combines the advantages of the full spectrum analysis method and the characteristic peak analysis method.

In summary, the five-point deconvolution method of uranium ore spectrum logging combines the two characteristics of subdivision interpretation and element stripping. By constructing the mathematical relationship between the unit layer, the multiple energy zones and the energy spectrum logging curve, it can realize rapid non-destructive testing and on-site quantitative interpretation, which is an advanced quantitative method of uranium ore that can obtain the uranium/thorium/potassium element content of stratiform ore layer or strata point by point.

The invention discloses a five-point deconvolution interpretation method for quantification of uranium ores by γ spectrum logging specifically refers to: carry out γ spectrum logging along the borehole to obtain logging curves in multiple energy zones, using these logging curves and energy spectrum features, inversion calculate the distribution of uranium content along the borehole; divide 7 energy zones according to the energy range of natural γ-ray, and collect them into 7 logging curves according to the count rate of each energy zone at each measuring point; according to the five-point deconvolution method for quantification of uranium ores by energy spectrum logging, inversion calculate the algorithm flow, calculation formula for solving unit layer uranium, thorium and potassium content involved in the distribution of strata uranium content along the borehole.

The invention discloses the technical scheme, algorithm formula and software flow of two types of "uranium ore energy spectrum logging five-point deconvolution method": "first stripping, then subdividing" and "first subdividing, then stripping", specifically:

I. The technical scheme of using high-resolution γ energy spectrum to determine 7 energy zones and their energy spectrum count rate.

i. Detector selection and basic principles of energy peak identification and selection.

Select a γ detector with excellent comprehensive performance, especially a detector with an energy resolution of 3.5% @662 keV or better. The detector can measure the total count rate of the energy spectrum above 1000 cps at the center point of the saturated uranium ore with a content of 100 ppm.

ii. The division scheme of the energy zone, the determination of the energy range and the acquisition of the energy spectrum logging curve.

The invention makes full use of the multiple energy zones and takes into account both the full spectrum analysis method and the characteristic peak analysis method. All count rates in the energy zones are involved in the quantitative calculation of subdivision interpretation and element stripping, thereby realizing fast energy spectrum logging. According to the full spectrum and its coverage characteristic peaks, 7 energy zones, i.e. 7 energy sections, are selected. Subdivide the "large" strata into "unit layers", and construct the relationship between energy zones, unit layers and energy spectrum logging curves. The energy peaks in FIG. 1 are analyzed, and the selected seven energy zones are:

The 0th energy zone, referred to as the total energy zone, has an energy range of [0.0 MeV, 2.8 MeV]; it reflects the counting effect of all characteristic peaks of uranium, thorium and potassium, as well as other energy peaks and Compton continuum, and obtain the total count rate of energy spectrum logging at a certain measuring point. This energy zone is not involved in uranium ore quantification, and is only used to evaluate whether the total count rate of the energy spectrum of the logging instrument meets the standard.

The 1st energy zone has an energy range of [0.4 MeV, 2.8 MeV], it reflects the counting effect of all the characteristic peaks in the high-energy zone of uranium, thorium and potassium, as well as other energy peaks and Compton continuum, and is the energy zone used for the quantification of uranium ores in the current γ total logging. This energy zone covers the largest characteristic peak of thorium at 2.615 MeV, recorded as thorium characteristic spectrum 2.

The 2nd energy zone has an energy range of [0.4 MeV, 2.3 MeV], it reflects the counting effect of part of the characteristic peaks in the high-energy zone of uranium, thorium and potassium, as well as other energy peaks and Compton continuum. This energy zone covers the characteristic peak of uranium at 2.20 MeV, recorded as uranium characteristic spectrum 3.

The 3rd energy zone has an energy range of [0.4 MeV, 2.0 MeV], it reflects the counting effect of part of the characteristic peaks in the high-energy zone of uranium, thorium and potassium, as well as other energy peaks and Compton continuum. This energy zone covers the largest characteristic peak of uranium at 1.765 MeV, recorded as uranium characteristic spectrum 2.

The 4th energy zone has an energy range of [0.4 MeV, 1.7 MeV], it reflects the counting effect of part of the characteristic peaks in the high-energy zone of uranium, thorium and potassium, as well as other energy peaks and Compton continuum. This energy zone covers the thorium characteristic peak of 2.615 MeV and the double escape peak of 1.595 MeV, recorded as thorium characteristic spectrum 1.

The 5th energy zone has an energy range of [0.4 MeV, 1.55 MeV], it reflects the counting effect of part of the characteristic peaks in the high-energy zone of uranium, thorium and potassium, as well as other energy peaks and Compton continuum. This energy zone covers the sole characteristic peak of potassium 1.461 MeV, recorded as potassium characteristic spectrum.

The 6th energy zone has an energy range of [0.4 MeV, 1.35 MeV], it reflects the counting effect of part of the characteristic peaks in the high-energy zone of uranium, thorium and potassium, as well as other energy peaks and Compton continuum. This energy zone covers multiple characteristic peaks of uranium/thorium, recorded as uranium characteristic spectrum 1.

By default, the depth coordinate of each measurement point of the energy spectrum logging is 4, j=1, 2, . . . is the number of the measurement points, and the 7 energy spectrum logging curves constructed by the 7 energy spectrum count rates of each measurement point are recorded as:

$\{N_i(Z_j)\}$, wherein $i=0,1,\ldots,6; j=1,2,\ldots$

In the formula, subscript i is the number of 7 energy zones; subscript j is the number of the measurement points, also the number of the unit layers; $N_i(Z_j)$ represents the count rate of the energy spectrum obtained at the j-th measurement point in the i-th energy zone.

II. Two technical schemes for uranium ore quantification using seven energy spectrum logging curves The invention adopts "five-point deconvolution method for uranium ore energy spectrum logging" for quantitative interpretation of uranium ore, and is divided into two technical schemes of "first subdividing, then stripping" and "first stripping, then subdividing".

i. The technical scheme of "first subdividing, then stripping"

The equation corresponding to the "five-point deconvolution method for uranium ore energy spectrum logging" is:

$$\begin{cases} N_i'(Z_j) = N_i(Z_j) - \dfrac{-N_i(Z_{j-2}) + 16N_i(Z_{j-1}) - 30N_i(Z_j) + 16N_i(Z_{j+1}) - N_i(Z_{j+2})}{12(\alpha_i \cdot \Delta Z)^2} \\ \sum_{k=1}^{3} A_{ki} q_k(Z_j) = N_i'(Z_j) \end{cases} \quad (1)$$

wherein, $\begin{cases} i = 1, 2, \ldots, 6 \\ j = 1, 2, \ldots \end{cases}$

In the formula,

Zj represents the sampling point of the borehole depth coordinate Z, i.e. the coordinates of the measuring point, and the subscript j=1, 2, . . . is the serial number of the measuring point;

ΔZ represents the sampling distance of the measuring point coordinates Z, which satisfies the condition of $\Delta Z = Z_{j+1} - Z_j \approx 10$ cm;

$N_i(Z_j)$ represents the count rate of the i-th energy zone at the measuring point coordinate $Z_j$, and the measuring points are connected in sequence; the obtained i-th energy spectrum logging curve is $\{N_i(Z_j)\}$, wherein I=1, 2, . . . , 6 is the serial number of the energy zone;

$q_k(Z_j)$ represents the content of the k-th radioactive element contained in the unit layer corresponding to the coordinate $Z_1$ of the measuring point, wherein k=1 is the uranium content, k=2 is the thorium content, and k=3 is the potassium content;

$A_{tk}$ is called the conversion factor, which means that when the saturated ore layer is constructed by the unit content of the k-th radioactive element, the count rate at its center point is $A_{tk}$, hence each radioactive element k has its own conversion factor in each energy zone i; the conversion factor is a set of constants obtained by using the measured data of standard model wells;

$\alpha_i$ is called a characteristic parameter, which is a parameter describing the characteristics of the strata, indicating that after the measuring point leaves the ore layer, its energy spectrum logging curve will drop rapidly according to the negative exponential law at the descending speed of $\alpha_i$, which is also the absorption probability of the gamma rays in the i-th energy zone being absorbed by the strata of unit thickness; the characteristic parameters are a set of constants obtained in real time using their own energy spectrum logging curves.

"First subdividing" is processing subdivision interpretation according to the first formula of Equation (1), that is, first obtain the intermediate variable $N_i'(Z_j)$, which is called the saturation count rate; the physical meaning of the saturation count rate is: when a saturated ore layer is constructed from rocks with uranium, thorium and potassium content of $q_k(Z_j)$, the count rate at the center of the ore layer is $N_i'(Z_j)$.

"Then stripping" is processing element stripping according to the second formula of Equation (1), which is using the saturation count rate $N_i'(Z_j)$ to obtain the content $q_k(Z_j)$ of uranium, thorium and potassium elements in each unit layer; however, in the second formula, the value range of k is smaller than the value range of i, that is, the unknown variable $q_k(Z_j)$ to be solved is less than the number of equations, and it is a singular equation that will have no solution if the equation is directly solved, which needs to be solved by the "least square method".

ii. The technical scheme of "first stripping, then subdividing"

The equation corresponding to the "five-point deconvolution method for uranium ore energy spectrum logging" is:

$$\begin{cases} \sum_{k=1}^{3} A_{ki} q_k'(Z_j) = N_i(Z_j) \\ q_k(Z_j) = q_k'(Z_j) - \dfrac{-q_k'(Z_{j-2}) + 16q_k'(Z_{j-1}) - 30q_k'(Z_j) + 16q_k'(Z_{j+1}) - q_k'(Z_{j+2})}{12(\alpha_i \cdot \Delta Z)^2} \end{cases} \quad (2)$$

wherein, $\begin{cases} i = 1, 2, \ldots, 6 \\ j = 1, 2, \ldots \end{cases}$

In the formula, the physical meaning of each parameter is shown in Equation (1).

"First stripping" is processing the element stripping according to the first formula of Equation (2), that is, first obtaining the intermediate variable $q_k'(Z_j)$; the variable is called saturation content, and the physical meaning is: when the content of uranium, thorium and potassium elements in a saturated ore layer is $q_k'(Z_j)$, the count rate at the center point of the ore layer will be $N_i(Z_j)$; however, in the first formula, the value range of k is smaller than the value range of i, that is, the unknown variable $q_k'(Z_j)$ to be solved is less than the number of equations, and it is a singular equation that will have no solution if the equation is directly solved, which needs to be solved by the "least square method".

"Then subdividing" refers to the subdivision interpretation according to the second formula of Equation (2), that is, the content $q_k(Z_j)$ of uranium, thorium and potassium in each unit layer is calculated using the intermediate variable $q_k'(Z_j)$.

The advantageous effects of the invention are:

Compared with the γ total logging and the γ spectrum logging uranium ore quantification method based on characteristic peaks, the invention does not need to manually delimit the boundary of the ore layer. By simultaneously obtaining the uranium, thorium and potassium elements of each unit layer, the logging speed is greatly improved. Furthermore, it has the advantages of improving drilling efficiency, reducing exploration cost, shortening uranium quantification cycle, etc., and can realize on-site analysis of uranium ore quantification through computer programming.

4. BRIEF DESCRIPTION OF ACCOMPANY DRAWINGS

In order to illustrate the technical schemes of the invention more clearly, the following briefly introduces the accompanying drawings needed in the embodiments. Obviously, the drawings in the following description are only some embodiments of the invention, and for those skilled in the art, other drawings can also be obtained from these drawings without any creative effort.

Figure 3:
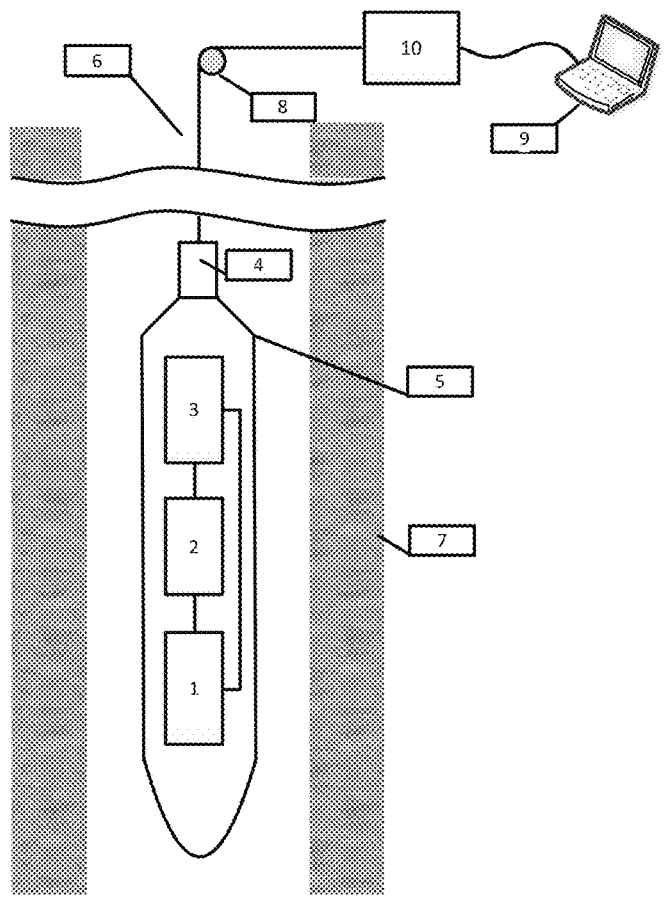
FIG. 3 is a block diagram and the basic structure of the γ energy spectrum logging tool according to the preferred embodiment of the invention.

In FIG. 3, 1 refers to the γ detector; 2 refers to a multi-channel pulse amplitude analyzer; 3 refers to communication and auxiliary circuits; 4 refers to a headstall; 5 refers to a stainless steel probe housing; 6 refers to logging cables; 7 refers to the rock mass; 8 refers to an encoder disc; 9 refers to a control and data processing platform; 10 refers to a power and winch control platform.

5. SPECIFIC EMBODIMENT OF THE INVENTION

The technical schemes in the embodiments of the application will be clearly and completely described hereinafter with reference to the drawings in the embodiments of the application. Obviously, the described embodiments are only a part of the embodiments of the application, rather than all the embodiments. Based on the embodiments in this application, all other embodiments obtained by those of ordinary skill in the art without creative work shall fall within the protection scope of this application.

In order to make the above objects, features and advantages of the application more clearly understood, the application will be described in further detail below with reference to the drawings and specific embodiments.

Figure 1:
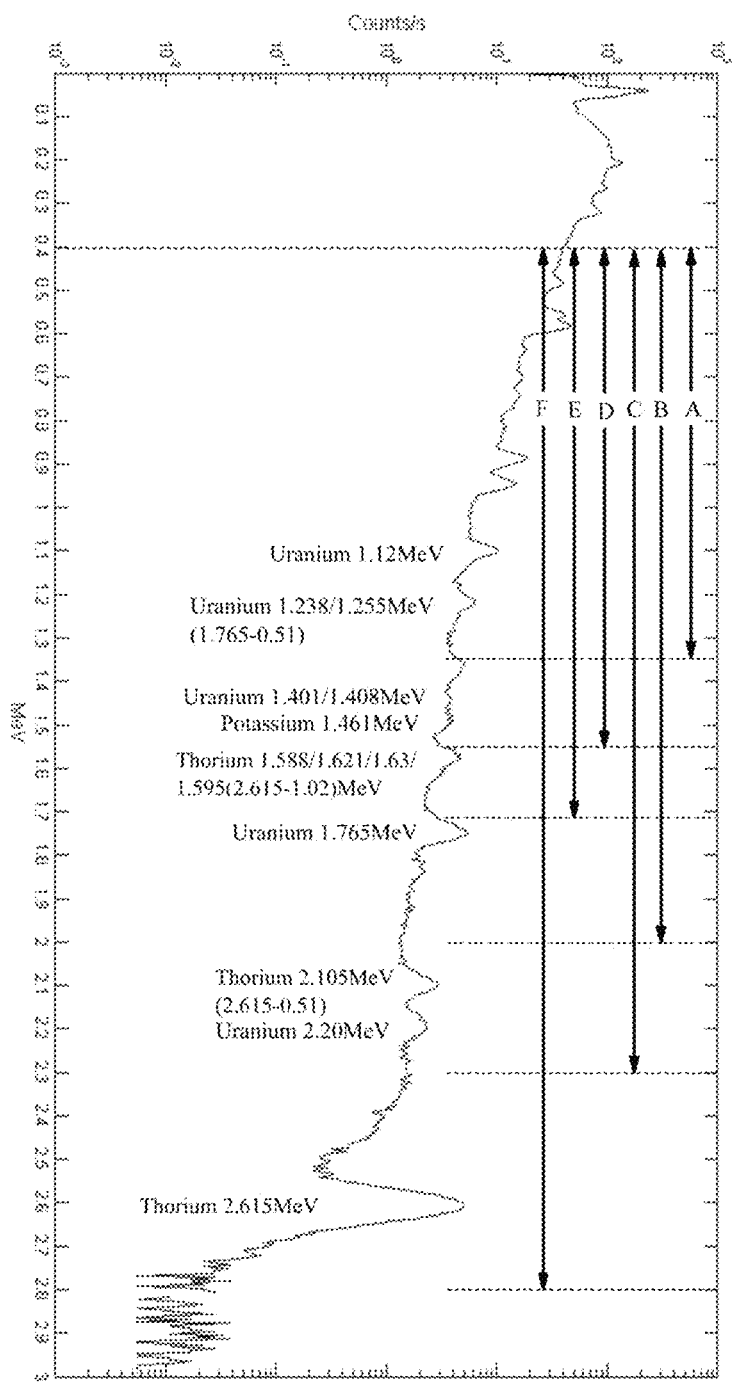
FIG. 1 is a schematic diagram of the γ energy spectrum curve, energy peak and energy zone division scheme of the saturated ore layer containing uranium/thorium/potassium and its central measuring point.
Figure 2:
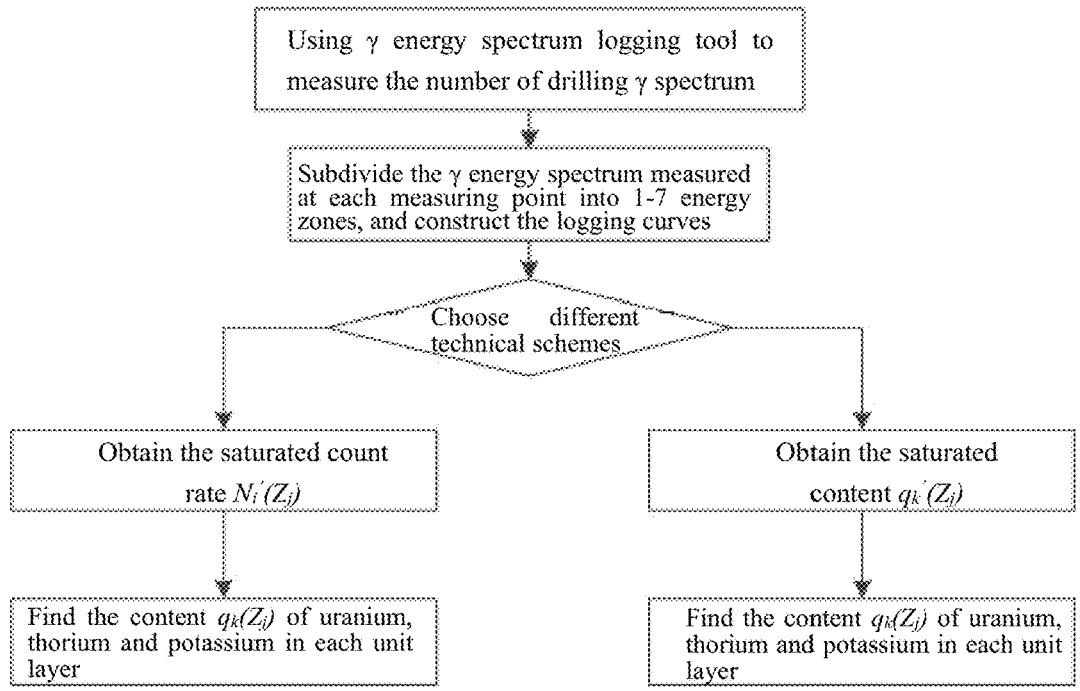
FIG. 2 is the processing flow chart of the preferred embodiment of the invention.
Figure 4:
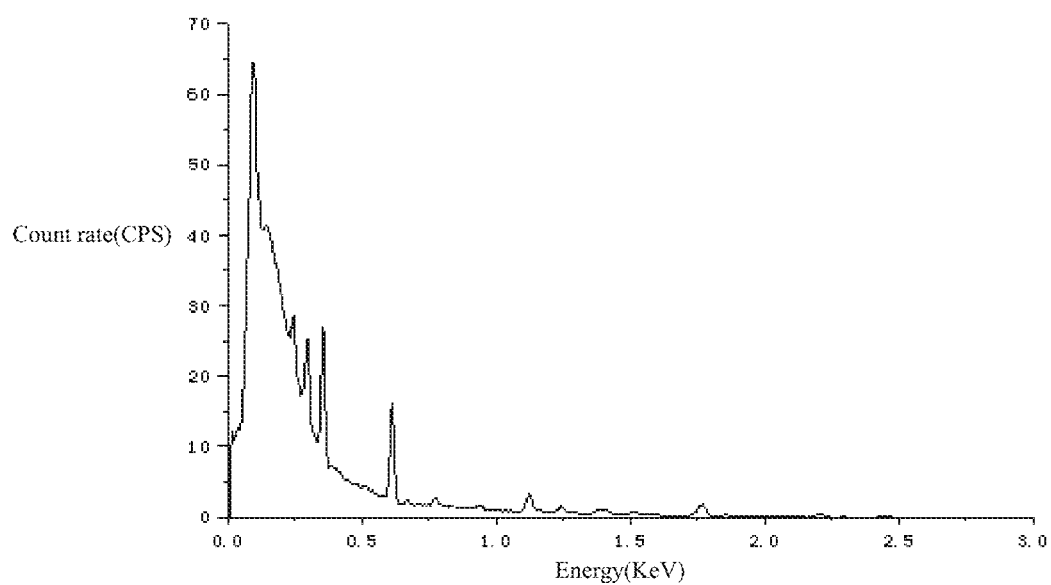
FIG. 4 is the γ energy spectrum curve of the center point of the ore bed of the preferred embodiment of the invention.
Figure 5:
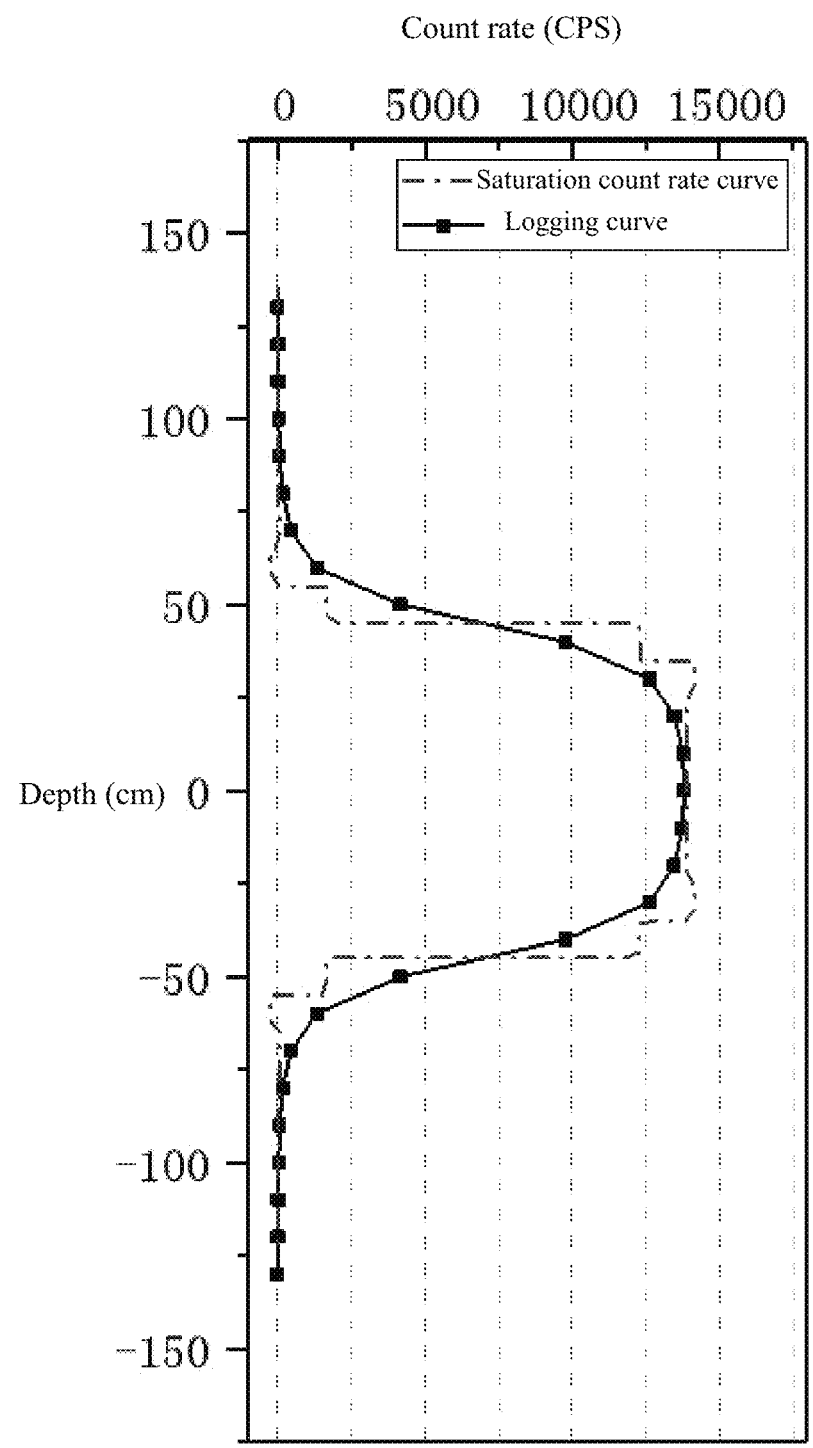
FIG. 5 is the log curve and saturation count rate curve of the 0th energy zone of the preferred embodiment of the invention.
Figure 6:
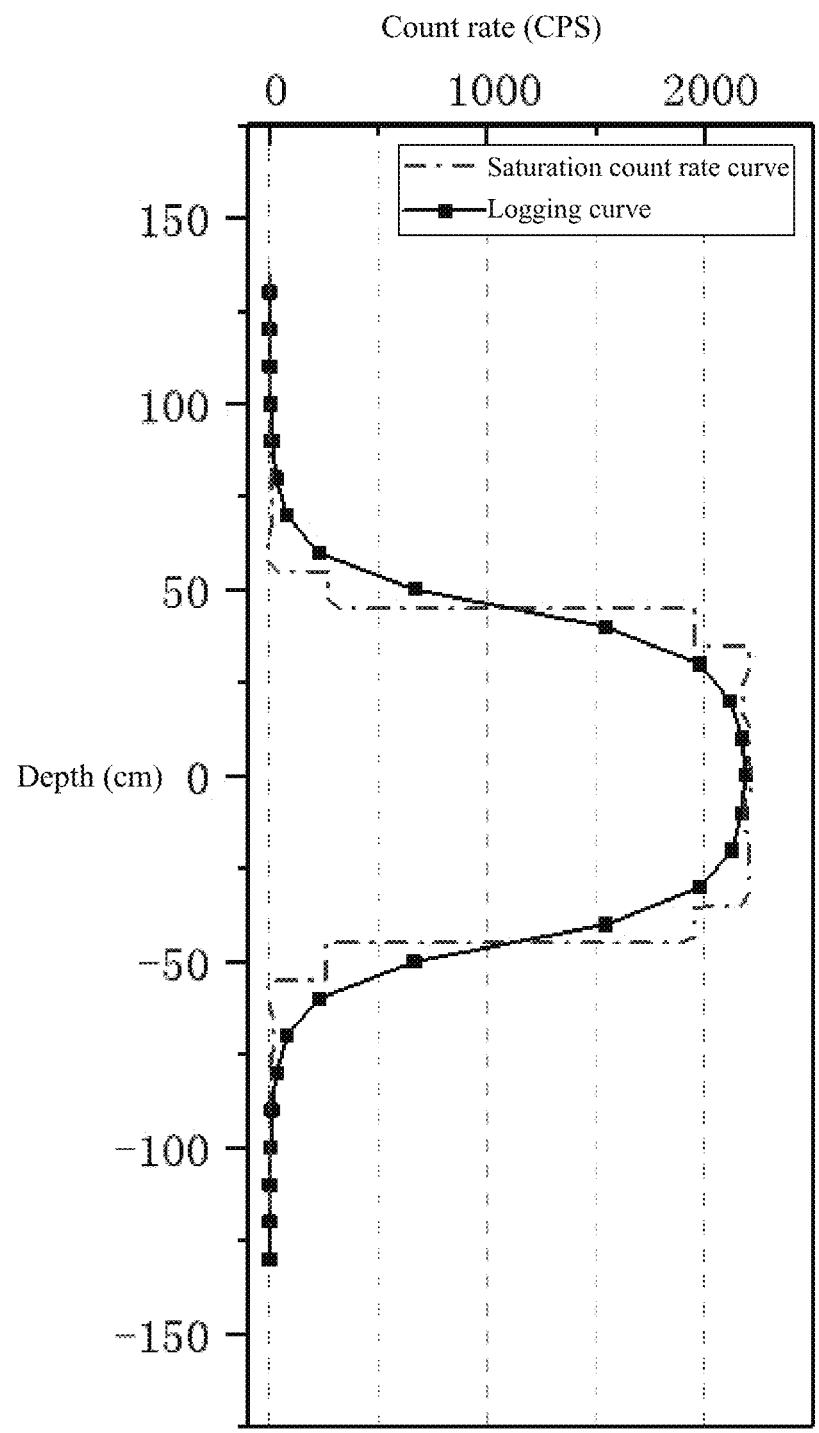
FIG. 6 is the log curve and saturation count rate curve of the 1st energy zone of the preferred embodiment of the invention.
Figure 7:
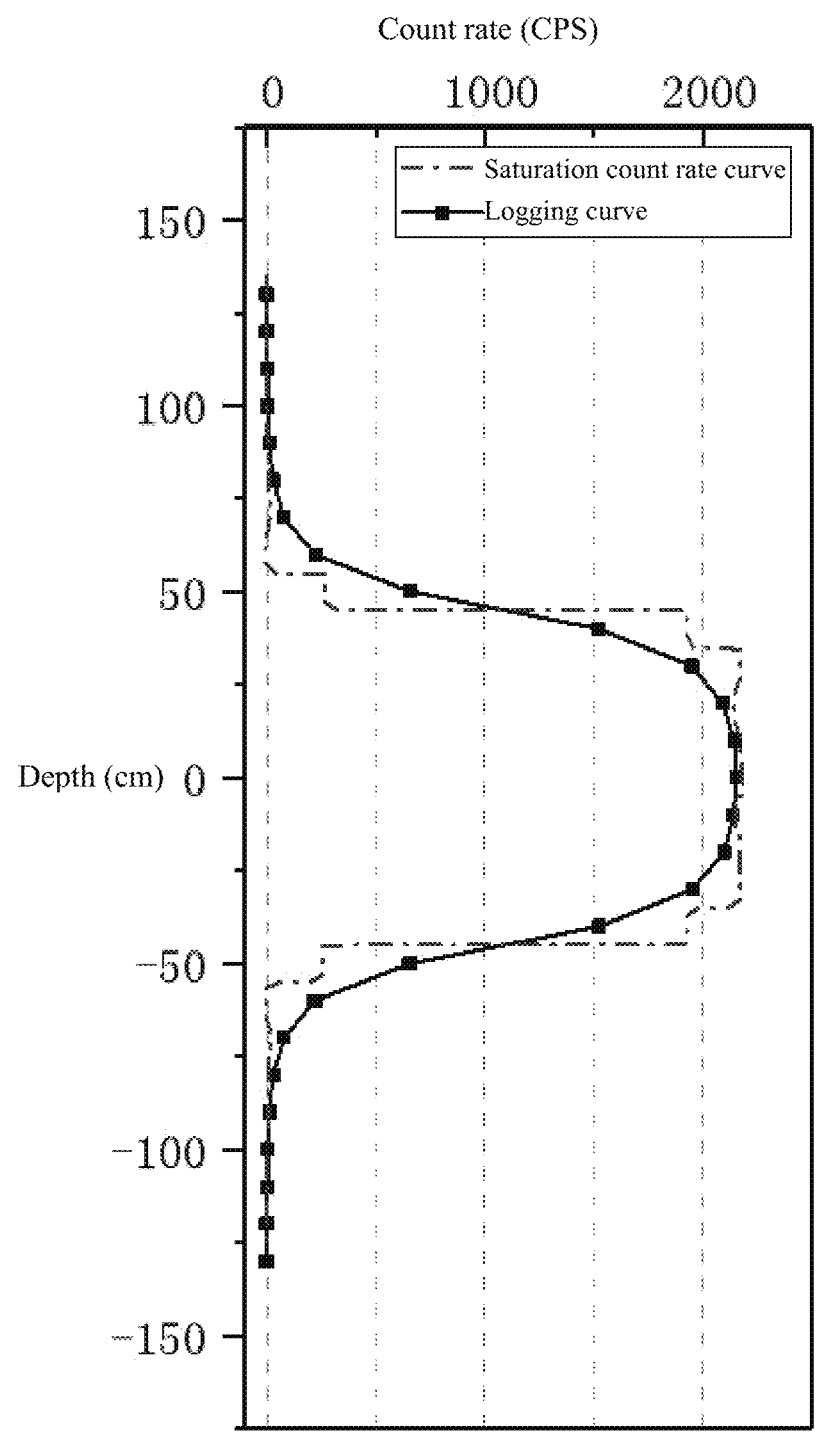
FIG. 7 is the log curve and saturation count rate curve of the 2nd energy zone of the preferred embodiment of the invention.
Figure 8:
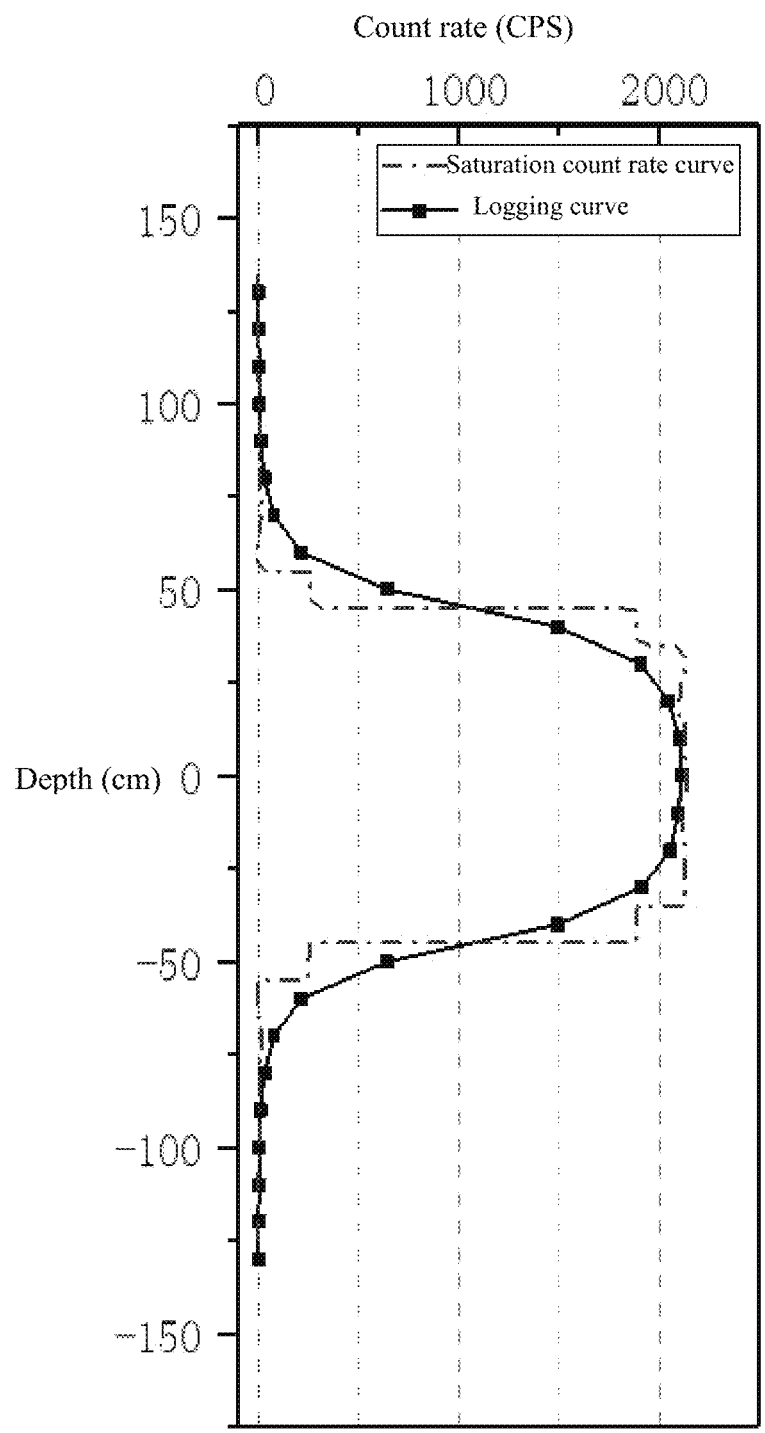
FIG. 8 is the log curve and saturation count rate curve of the 3rd energy zone of the preferred embodiment of the invention.
Figure 9:
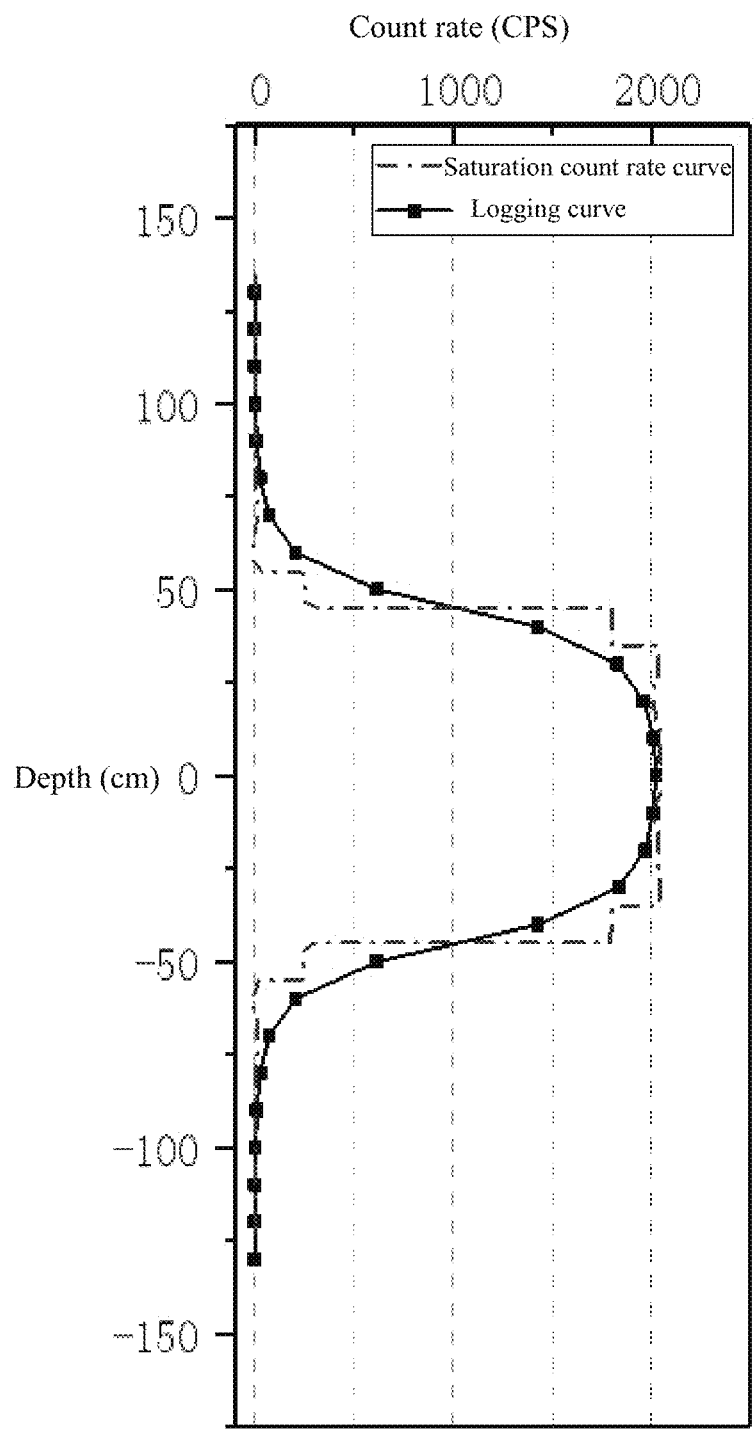
FIG. 9 is the log curve and saturation count rate curve of the 4th energy zone of the preferred embodiment of the invention.
Figure 10:
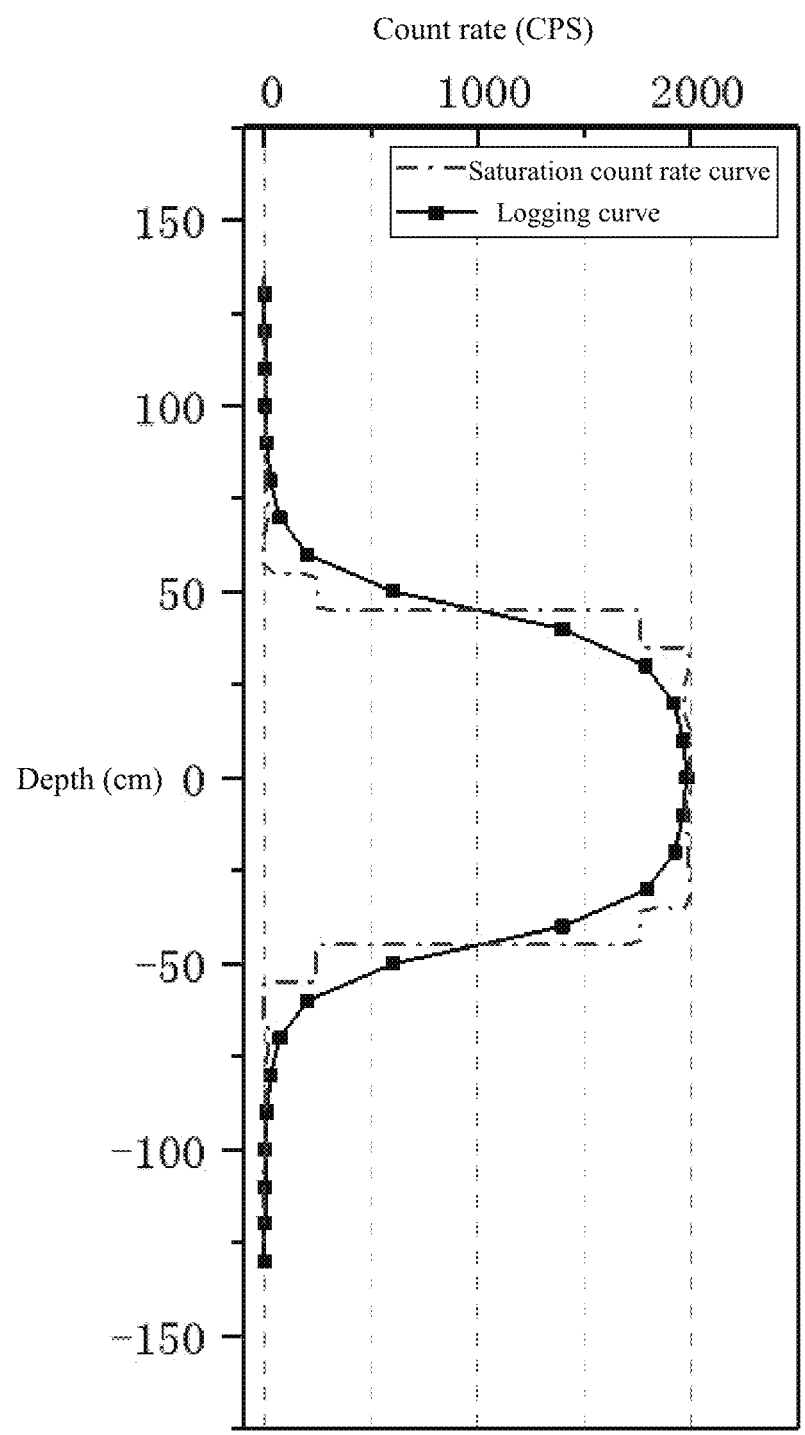
FIG. 10 is the log curve and saturation count rate curve of the 5th energy zone of the preferred embodiment of the invention.
Figure 11:
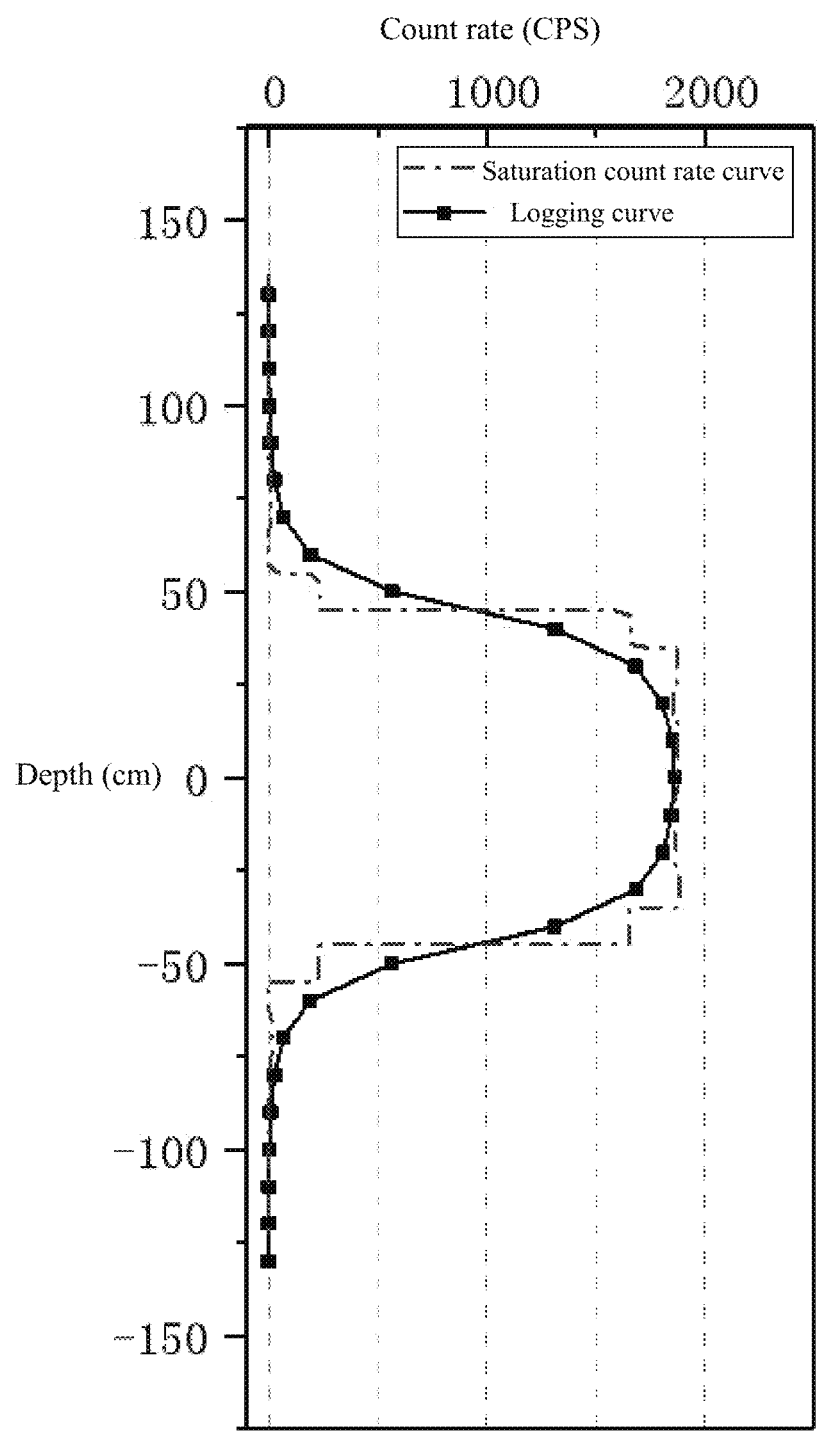
FIG. 11 is the log curve and saturation count rate curve of the 6th energy zone of the preferred embodiment of the invention.

The embodiment mainly provides a logging method for determining the content of natural radioactive elements such as uranium, thorium and potassium in layered uranium ore or layered strata by using γ energy spectrum logging, comprising the following content: the γ energy spectrum curve of the saturated ore bed containing uranium/thorium/potassium and its central measuring point, schematic diagram of energy peak and energy zone division scheme (as shown in FIG. 1), the processing flow chart of the preferred embodiment of the invention (as shown in FIG. 2), the basic structure of the γ energy spectrum logging tool and its block diagram (as shown in FIG. 3), the γ energy spectrum logging data obtained from the layered uranium ore (strata) well obtained by simulation calculation (the γ energy spectrum curve of the center point of the ore layer is shown in FIG. 4), simulated logging curves (FIG. 5-FIG. 11), uranium/thorium/potassium interpretation result curve (FIG. 12-FIG. 14), the uranium ore quantification of layered ore layer or strata uranium/thorium/potassium element content can be obtained point by point, etc. The embodiment is described as follows:

The invention discloses the technical scheme, algorithm formula and software flow of two types of "uranium ore energy spectrum logging five-point deconvolution method": "first stripping, then subdividing" and "first subdividing, then stripping", specifically:

The technical scheme of using high-resolution γ energy spectrum to determine 7 energy zones and their energy spectrum count rate Basic Principles of Energy Peak Identification and Selection For the saturated ore layer with high uranium/thorium content and moderate potassium content, the energy spectrum measured at the central measuring point is shown in FIG. 1. In the figure, the main energy peaks with energy higher than 1 MeV and clearly distinguishable are characteristic peaks, escape peaks and overlapping peaks formed by them. They are:

the characteristic peaks, including: the characteristic peaks of thorium are 2.615 MeV, 1.623 MeV, 1.621 MeV, 1.588 MeV; the characteristic peaks of uranium are 2.20 MeV, 1.765 MeV, 1.408 MeV, 1.401 MeV, 1.238 MeV, 1.12 MeV; the characteristic peaks of potassium are 1.461 MeV.

the escape peaks, including: single escape peak 2.105 MeV formed by thorium characteristic peak 2.615 MeV, double escape peak 1.595 MeV; single escape peak 1.255 MeV formed by uranium characteristic peak 1.765 MeV the overlapping peaks, including: in the above energy peaks, 1.595 MeV, 1.588 MeV, 1.621 MeV, 1.623 MeV overlap each other; 1.255 MeV, 1.238 MeV overlap each other; 1.401 MeV, 1.408 MeV overlap each other.

As shown in FIG. 1, the count rate of the energy peaks of low-energy rays and the Compton continuum in the detector is very large. On the energy spectrum, the energy peaks and Compton continuum of high energy and low energy differ by 2 orders of magnitude. The low energy Compton continuum is closely related to the material composition of the stratum rock, it is beneficial to estimate the rock density and divide the lithology. However, it is an important interference factor for the quantification of uranium ore in γ logging, so the count rate in the low energy area does not participate in the quantification of uranium ore. Under the premise of ensuring a high total count rate, the current lower limit of the energy range for γ total logging uranium ore quantification is 0.4

MeV. The invention also uses the spectral count rate with energy higher than 0.4 MeV to perform γ spectral logging for uranium ore quantification.

Software Design Flow Chart of Five-Point Deconvolution Method for γ Energy Spectrum Logging of Uranium Ore Quantification According to the two types of "five-point deconvolution method for uranium ore energy spectrum logging" that "first stripping, then subdividing" and "first subdividing, then stripping" and their formulas, the software flow disclosed by the invention is shown in FIG. 2.

1. The basic structure of γ energy spectrum logging tool

γ energy spectrum logging tool is an instrument and equipment that converts the measured γ rays of different energies into nuclear pulse amplitude distribution (often called γ energy spectrum). The γ energy spectrum logging tool consists of seven parts (the basic structure is shown in FIG. 3), comprising:

γ detector 1; multi-channel pulse amplitude analyzer 2; communication and auxiliary circuits 3; headstall 4; stainless steel probe housing 5; logging cable 6; rock mass 7; encoder disc 8; control and data processing platform 9; power and winch control platform 10.

Select a γ detector with excellent comprehensive performance, especially a detector with an energy resolution of 3.5% @662 keV or better. The detector can measure the total count rate of the energy spectrum above 1000 cps at the center point of the saturated uranium ore with a content of 100 ppm. For example, choose LaBr3(Ce) crystal detector.

In the embodiment, the depth interval is 10 cm, and the simulated γ energy spectrum logging instrument measures and saves the borehole γ energy spectrum data at a constant speed. The embodiment results of the γ energy spectrum curve at the center point of the ore layer are shown in FIG. 4.

2. Determination of γ energy range and acquisition of γ energy spectrum logging curve The key factors that cause the change of the energy spectrum of each measuring point include: the type and content of radioactive elements contained in the ore layer, interaction of rays with strata, detectors and other media in their boreholes. The characteristic peaks reflect the γ-rays of inherent energy released by uranium, thorium and potassium. Escape peaks and Compton continuum are caused by the interaction between rays and medium, and are secondary reflections of characteristic peaks. The interaction between the ray and the medium will also weaken the characteristic peaks and escape peaks, strengthen the Compton continuum, and then cover up the inherent characteristics of the γ-ray emitted by the uranium/thorium/potassium, which is an unfavorable factor for the resolution of element types and element content.

According to the energy zone division scheme provided by the invention, each measured γ energy spectrum is decomposed into 7 energy zones, wherein:

The 0th energy zone, represented by $E_0$, has an energy range of [0.0 MeV, 2.8 MeV]; it reflects the counting effect of all characteristic peaks of uranium, thorium and potassium, as well as other energy peaks and Compton continuum, and obtain the total count rate of energy spectrum logging at a certain measuring point. This energy zone is not involved in uranium ore quantification, and is only used to evaluate whether the total count rate of the energy spectrum of the logging instrument meets the standard. The 1st energy zone, represented by $E_1$, has an energy range of [0.4 MeV, 2.8 MeV], it reflects the counting effect of all the characteristic peaks in the high-energy zone of uranium, thorium and potassium, as well as other energy peaks and Compton continuum, and is the energy zone used for the quantification of uranium ores in the current γ total logging. This energy zone covers the largest characteristic peak of thorium at 2.615 MeV, recorded as thorium characteristic spectrum 2. The 2nd energy zone, represented by $E_2$, has an energy range of [0.4 MeV, 2.3 MeV], it reflects the counting effect of part of the characteristic peaks in the high-energy zone of uranium, thorium and potassium, as well as other energy peaks and Compton continuum. This energy zone covers the characteristic peak of uranium at 2.20 MeV, recorded as uranium characteristic spectrum 3. The 3rd energy zone, represented by $E_3$, has an energy range of [0.4 MeV, 2.0 MeV], it reflects the counting effect of part of the characteristic peaks in the high-energy zone of uranium, thorium and potassium, as well as other energy peaks and Compton continuum. This energy zone covers the largest characteristic peak of uranium at 1.765 MeV, recorded as uranium characteristic spectrum 2. The 4th energy zone, represented by $E_4$, has an energy range of [0.4 MeV, 1.7 MeV], it reflects the counting effect of part of the characteristic peaks in the high-energy zone of uranium, thorium and potassium, as well as other energy peaks and Compton continuum. This energy zone covers the thorium characteristic peak of 2.615 MeV and the double escape peak of 1.595 MeV, recorded as thorium characteristic spectrum 1. The 5th energy zone, represented by $E_5$, has an energy range of [0.4 MeV, 1.55 MeV], it reflects the counting effect of part of the characteristic peaks in the high-energy zone of uranium, thorium and potassium, as well as other energy peaks and Compton continuum. This energy zone covers the sole characteristic peak of potassium 1.461 MeV, recorded as potassium characteristic spectrum. The 6th energy zone, represented by $E_6$, has an energy range of [0.4 MeV, 1.35 MeV], it reflects the counting effect of part of the characteristic peaks in the high-energy zone of uranium, thorium and potassium, as well as other energy peaks and Compton continuum. This energy zone covers multiple characteristic peaks of uranium/thorium, recorded as uranium characteristic spectrum 1.

Sum the data for each energy zone, subtract the background to get the net count $N_i$. Let the depth coordinate of each measuring point be 4, where j=1, 2, . . . is the serial number of the measuring point; the seven energy spectrum logging curves constructed from the seven energy interval count rates of each measuring point are recorded as:

$\{N_i(Z_j)\}$, wherein $i=0,1, \ldots, 6; j=1,2, \ldots$

Proceed the γ energy spectrum data of the borehole of the embodiment according to the above method, then obtain seven energy spectrum logging curves, as shown in the solid lines in FIG. 5-FIG. 11.

3. Using the two technical schemes of "first subdividing, then stripping" or "first stripping, then subdividing" to calculate the logging curves, the contents of uranium, thorium and potassium in each unit layer can be obtained at the same time.

The technical scheme of "first subdividing, then stripping" is:

"First subdividing" is processing subdivision interpretation according to the first formula of Equation (1), that is, first obtain the intermediate variable $N_i'(Z_j)$, which is called the saturation count rate; the physical meaning of the saturation count rate is: when a saturated ore layer is constructed from rocks with uranium, thorium and potassium content of $q_k(Z_j)$, the count rate at the center of the ore layer is $N_i'(Z_j)$;

"Then stripping" is processing element stripping according to the second formula of Equation (1), which is using the saturation count rate $N_i'(Z_j)$ to obtain the content $q_k(Z_j)$ of uranium, thorium and potassium elements in each unit layer; however, in the second formula, the value range of k is smaller than the value range of i, that is, the unknown variable $q_k(Z_j)$ to be solved is less than the number of equations, and it is a singular equation that will have no solution if the equation is directly solved, which needs to be solved by the "least square method";

$$\begin{cases} N_i'(Z_j) = N_i(Z_j) - \dfrac{-N_i(Z_{j-2}) + 16N_i(Z_{j-1}) - 30N_i(Z_j) + 16N_i(Z_{j+1}) - N_i(Z_{j+2})}{12(\alpha_i \cdot \Delta Z)^2} \\ \sum_{k=1}^{3} A_{ki} q_k(Z_j) = N_i'(Z_j) \end{cases} \quad (1)$$

$$\text{wherein, } \begin{cases} i = 1, 2, \ldots, 6 \\ j = 1, 2, \ldots \end{cases};$$

In the formula, $Z_j$ represents the sampling point of the borehole depth coordinate Z, i.e. the coordinates of the measuring point, and the subscript j=1, 2, ... is the serial number of the measuring point;

$\Delta Z$ represents the sampling distance of the measuring point coordinates Z, which satisfies the condition of $\Delta Z$ $Z_{j+1} - Z_j \approx 10$ cm;

$N_i(Z_j)$ represents the count rate of the i-th energy zone at the measuring point coordinate $Z_j$, and the measuring points are connected in sequence; the obtained i-th energy spectrum logging curve is $\{N_i(Z_j)\}$, wherein i=1, 2, ..., 6 is the serial number of the energy zone;

$q_k(Z_j)$ represents the content of the k-th radioactive element contained in the unit layer corresponding to the coordinate $Z_1$ of the measuring point, wherein k=1 is the uranium content, k=2 is the thorium content, and k=3 is the potassium content;

$A_{ik}$ is called the conversion factor, which means that when the saturated ore layer is constructed by the unit content of the k-th radioactive element, the count rate at its center point is $A_{ik}$, hence each radioactive element k has its own conversion factor in each energy zone i; the conversion factor is a set of constants obtained by using the measured data of standard model wells;

$\alpha_i$ is called a characteristic parameter, which is a parameter describing the characteristics of the strata, indicating that after the measuring point leaves the ore layer, its energy spectrum logging curve will drop rapidly according to the negative exponential law at the descending speed of $\alpha_i$, which is also the absorption probability of the gamma rays in the i-th energy zone being absorbed by the strata of unit thickness; the characteristic parameters are a set of constants obtained in real time using their own energy spectrum logging curves.

The technical scheme of "first stripping, then subdividing" is:

"First stripping" is processing the element stripping according to the first formula of Equation (2), that is, first obtaining the intermediate variable $q_k'(Z_j)$; the variable is called saturation content, and the physical meaning is: when the content of uranium, thorium and potassium elements in a saturated ore layer is $q_k'(Z_j)$, the count rate at the center point of the ore layer will be $N_i'(Z_j)$; however, in the first formula, the value range of k is smaller than the value range of i, that is, the unknown variable $q_k'(Z_j)$ to be solved is less than the number of equations, and it is a singular equation that will have no solution if the equation is directly solved, which needs to be solved by the "least square method";

"Then subdividing" refers to the subdivision interpretation according to the second formula of Equation (2), that is, the content $q_k(Z_j)$ of uranium, thorium and potassium in each unit layer is calculated using the intermediate variable $q_k'(Z_j)$;

$$\begin{cases} \sum_{k=1}^{3} A_{ki} q_k'(Z_j) = N_i(Z_j) \\ q_k(Z_j) = q_k'(Z_j) - \dfrac{-q_k'(Z_{j-2}) + 16q_k'(Z_{j-1}) - 30q_k'(Z_j) + 16q_k'(Z_{j+1}) - q_k'(Z_{j+2})}{12(\alpha_i \cdot \Delta Z)^2} \end{cases} \quad (2)$$

$$\text{wherein, } \begin{cases} i = 1, 2, \ldots, 6 \\ j = 1, 2, \ldots \end{cases};$$

In the formula, the physical meaning of each parameter is shown in Equation (1).

4. Methods and Embodiments of Quantitative Interpretation of Uranium Ore

According to the technical scheme of "first subdividing, then stripping" provided by the invention, deconvolution calculation is performed on the obtained seven energy spectrum logging curves according to formula (3) respectively, and the saturated count rate $N_i'(Z_j)$ of each ore layer is obtained. The calculation results are shown in the dotted lines in FIG. 5-FIG. 11.

$$N_i'(Z_j) = \\ N_i(Z_j) - \dfrac{-N_i(Z_{j-2}) + 16N_i(Z_{j-1}) - 30N_i(Z_j) + 16N_i(Z_{j+1}) - N_i(Z_{j+2})}{12(\alpha_i \cdot \Delta Z)^2} \quad (3)$$

$$\text{wherein, } \begin{cases} i = 1, 2, \ldots, 6 \\ j = 1, 2, \ldots \end{cases};$$

It should be noted that formula (3) needs to obtain the characteristic parameter $\alpha_1$ respectively through the curves during calculation. The calculation method is the same as the calculation method of the characteristic parameter a in the subdivision interpretation technology of γ total amount of uranium ore.

At last, use the numerical solution of singular equations such as the "least square method", and perform element stripping according to formula (4). That is, the content $q_k(Z_j)$ of uranium, thorium and potassium elements in each unit layer is obtained by using the saturation count rate kVA and the interpretation results are shown in FIG. 12-FIG. 14.

$$\sum_{k=1}^{3} A_{ki} q_k(Z_j) = N_i'(Z_j) \quad (4)$$

$$\text{wherein, } \begin{cases} i = 1, 2, \ldots, 6 \\ j = 1, 2, \ldots \end{cases}$$

Figure 12:
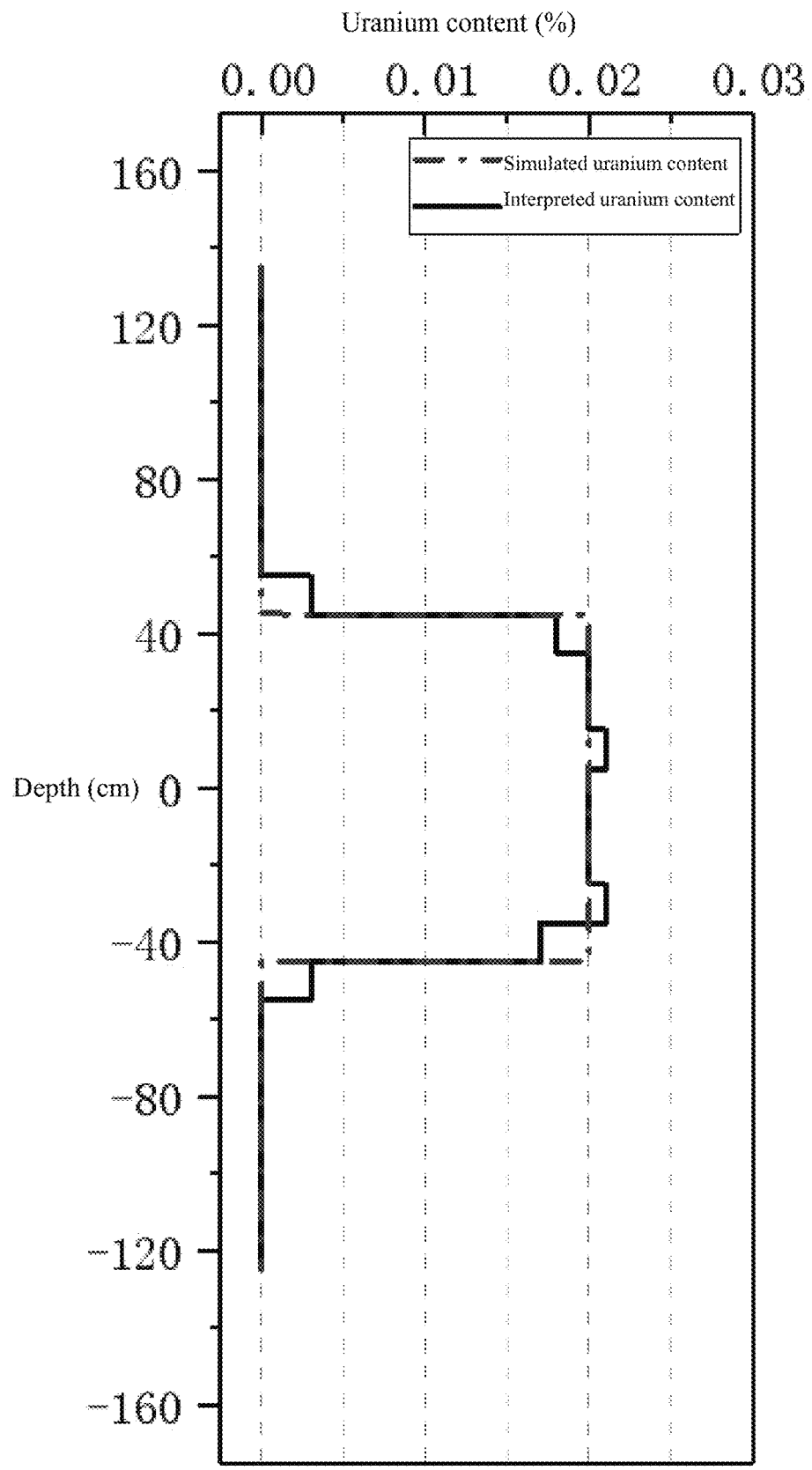
FIG. 12 is a graph of the uranium interpretation result according to the preferred embodiment of the invention.
Figure 13:
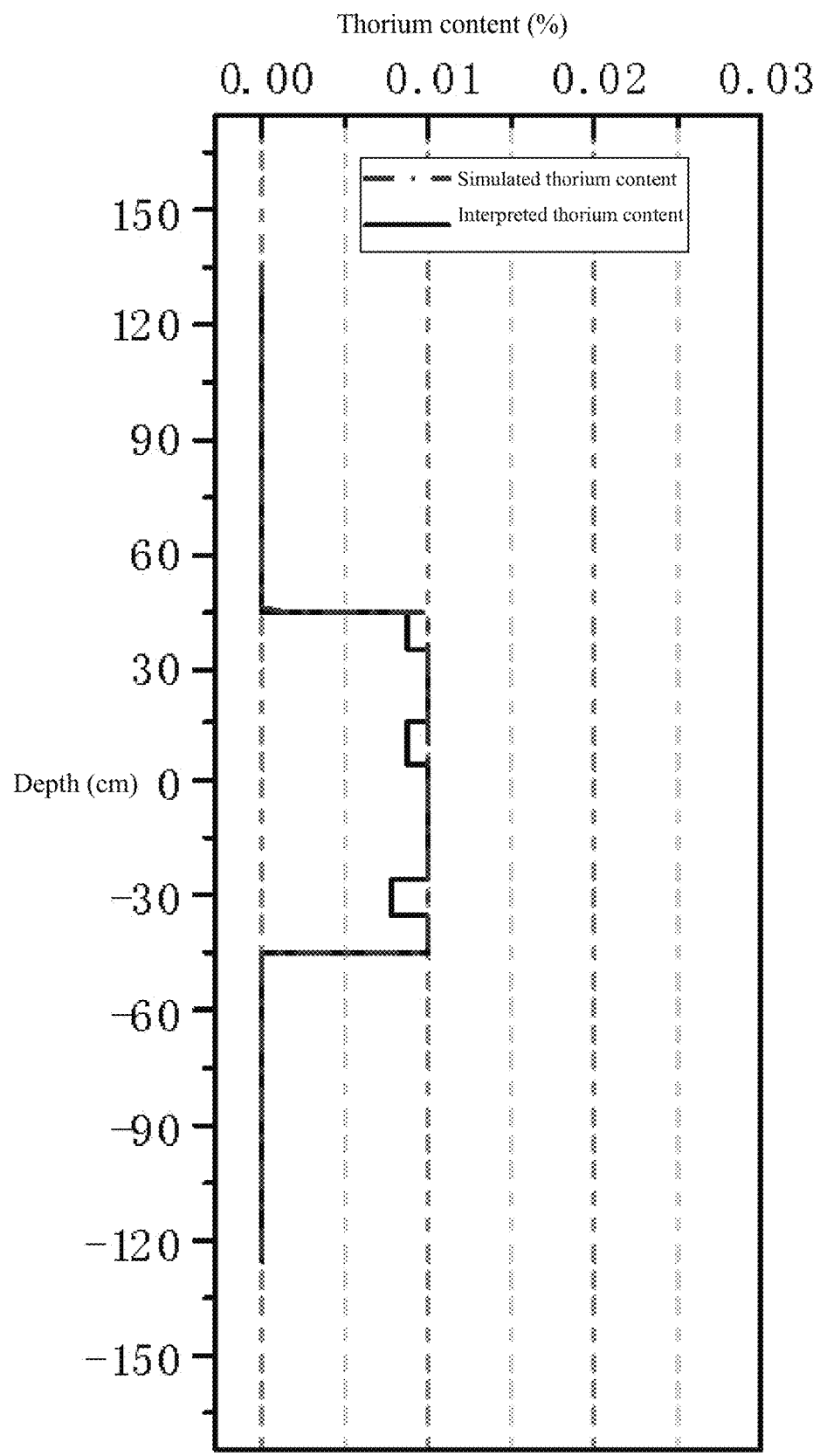
FIG. 13 is a graph of the thorium interpretation result according to the preferred embodiment of the invention.
Figure 14:
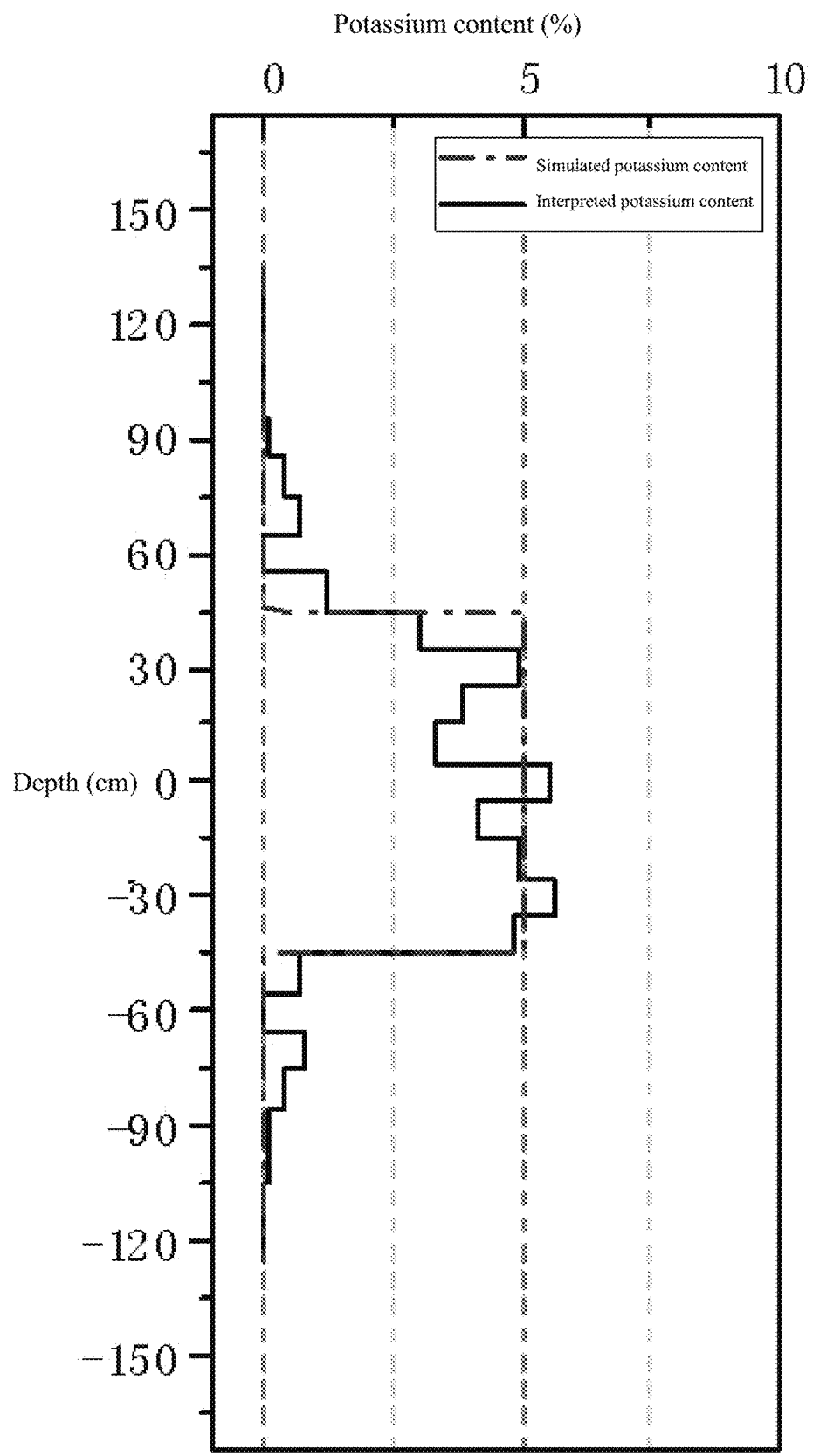
FIG. 14 is a graph of the potassium interpretation result according to the preferred embodiment of the invention.

It can be seen from FIG. 12-FIG. 14 that the error between the content $q_k(Z_j)$ of uranium, thorium and potassium in each unit layer explained by this method and the content interpretation result set by the simulation is not more than 10%, which complies with the requirements of the current logging specifications for uranium ores. And it strips out thorium and potassium elements, improving the accuracy of quantitative interpretation of uranium ore.

The above-mentioned embodiments are only the description of the preferred mode of the application, rather than limiting the scope of the application. Without departing from the design spirit of the application, various modifications and improvements made by those of ordinary skill in the art to the technical schemes of the application shall all fall within the protection scope determined by the claims of the application.

The invention claimed is:

1. A five-point deconvolution interpretation method for quantification of uranium ores by γ spectrum logging, the method comprising:
   performing, by a γ detector, γ spectrum logging along a borehole formed in strata, to obtain a γ energy spectrum of each of measurement points;
   dividing the γ energy spectrum into 7 energy zones, and obtaining 7 energy zones logging curves according to count rates of each of the 7 energy zones;
   performing "first subdividing, then stripping" or "first stripping, then subdividing" on the 7 energy zones logging curves, to thereby obtain contents of uranium, thorium and potassium in each of unit layers of the strata for improving accuracy of quantitative interpretation of the uranium ores; and
   exploring uranium resources in the strata based on the contents of uranium, thorium and potassium;
   wherein an energy resolution of the γ detector is equal to or greater than 3.5% @662 keV, and a total count rate of an energy spectrum measured by the γ detector at a center point of a saturated uranium layer with a uranium content of 100 ppm of the strata is not lower than 1000 cps;
   wherein the 7 energy zones consist of:
      a 0th energy zone, wherein the 0th energy zone has an energy range of [0.0 MeV, 2.8 MeV], the 0th energy zone is not involved in uranium ore quantification, and the 0th energy zone is only used to evaluate whether the total count rate of the energy spectrum measured by the γ detector meets a defined standard;
      a 1st energy zone, wherein the 1st energy zone has an energy range of [0.4 MeV, 2.8 MeV], the 1st energy zone covers a largest characteristic peak of thorium at 2.615 MeV, and the 1st energy zone is recorded as a thorium characteristic spectrum 2;
      a 2nd energy zone, wherein the 2nd energy zone has an energy range of [0.4 MeV, 2.3 MeV], the 2nd energy zone covers a characteristic peak of uranium at 2.20 MeV, and the 2nd energy zone is recorded as a uranium characteristic spectrum 3;
      a 3rd energy zone, wherein the 3rd energy zone has an energy range of [0.4 MeV, 2.0 MeV], the 3rd energy zone covers a largest characteristic peak of uranium at 1.765 MeV, and the 3rd energy zone is recorded as a uranium characteristic spectrum 2;
      a 4th energy zone, wherein the 4th energy zone has an energy range of [0.4 MeV, 1.7 MeV], the 4th energy zone covers a thorium characteristic peak of 2.615 MeV and a double escape peak of 1.595 MeV, and the 4th energy zone is recorded as a thorium characteristic spectrum 1;
      a 5th energy zone, wherein the 5th energy zone has an energy range of [0.4 MeV, 1.55 MeV], the 5th energy zone covers a sole characteristic peak of potassium 1.461 MeV, and the 5th energy zone is recorded as a potassium characteristic spectrum; and
      a 6th energy zone, wherein the 6th energy zone has an energy range of [0.4 MeV, 1.35 MeV] the 6th energy zone covers characteristic peaks of uranium/thorium, and the 6th energy zone is recorded as a uranium characteristic spectrum 1; and
   wherein the 7 energy zones logging curves are recorded as $\{N_i(Z_j)\}$, where $i=0, 1, \ldots, 6$; $j=1, 2, \ldots$, i represents a number of one of the 7 energy zones; j represents a number of one of the measurement points, and is also a number of one of the unit layers; $Z_j$ represents a coordinate of a j-th measurement point; and $N_i(Z_j)$ represents a count rate of an energy spectrum obtained at a j-th measurement point in an i-th energy zone of the 7 energy zones.

2. The method as claimed in claim 1, wherein the performing "first subdividing, then stripping" on the 7 energy zones logging curves comprises:
   performing subdivision interpretation according to a first formula, comprising:
      obtaining a saturation count rate $N_i'(Z_j)$, wherein a physical meaning of the saturation count rate $N_i'(Z_j)$ is: when a saturated ore layer is constructed by using rocks with a content $q_k(Z_j)$ of uranium, thorium and potassium elements, a count rate at a center of this saturated ore layer is $N_i'(Z_j)$; and
   performing element stripping according to a second formula, comprising:
      using the saturation count rate $N_i'(Z_j)$ to obtain a content $q_k(Z_j)$ of uranium, thorium and potassium elements in each of the unit layers, wherein a value range of k in the second formula is smaller than a value range of i, and the content $q_k(Z_j)$ of uranium, thorium and potassium elements in each of the unit layers is solved by using a least square method;

$$\begin{cases} N_i'(Z_j) = N_i(Z_j) - \dfrac{-N_i(Z_{j-2}) + 16N_i(Z_{j-1}) - 30N_i(Z_j) + 16N_i(Z_{j+1}) - N_i(Z_{j+2})}{12(\alpha_i \cdot \Delta Z)^2} & \text{(formula 1)} \\ \sum_{k=1}^{3} A_{ki} q_k(Z_j) = N_i'(Z_j) & \text{(formula 2)} \end{cases}$$

wherein, $\begin{cases} i = 1, 2, \ldots, 6 \\ j = 1, 2, \ldots \end{cases}$;

$Z_j$ represents a sampling point of a depth coordinate Z of the borehole, $\Delta Z$ represents a sampling distance of the depth coordinate Z, and $\Delta Z = Z_{j+1} - Z_j \sim 10$ cm; $q_k(Z_j)$ represents a content of a k-th radioactive element contained in a unit layer corresponding to the coordinate $Z_j$ of the j-th measurement point, a content corresponding to k=1 is a uranium content, a content corresponding to k=2 is a thorium content, and a content corresponding to k=3 is a potassium content;

$A_{ik}$ represents a conversion factor, when a saturated ore layer is constructed by a unit content of the k-th radioactive element, a count rate at a center point of this saturated ore layer is $A_{ik}$, and the conversion factor is a set of constants obtained by using measured data of standard model wells; and $\alpha_i$ represents a characteristic parameter, and the characteristic parameter is an absorption probability of gamma rays in the i-th energy zone being absorbed by strata of unit thickness.

3. The method as claimed in claim 1, wherein the performing "first stripping, then subdividing" on the 7 energy zones logging curves comprises:
   performing element stripping according to a first formula, comprising:
      obtaining a saturation content $q_k'(Z_j)$, wherein a physical meaning of the saturation content $q_k'(Z_j)$ is: when a content of uranium, thorium and potassium elements in a saturated ore layer is $q_k'(Z_j)$, a count rate at a center point of this saturated ore layer is $N_i(Z_j)$; in the first formula, a value range of k is smaller than a value range of i, the saturation content $q_k'(Z_j)$ is solved by using a least square method; and performing subdivision interpretation according to a second formula, comprising:
calculating a content $q_k(Z_j)$ of uranium, thorium and potassium elements in each of the unit layers according to the saturation content $q_k'(Z_j)$;

$$\begin{cases} \sum_{k=1}^{3} A_{ki} q_k'(Z_j) = N_i(Z_j) & \text{(formula 1)} \\ q_k(Z_j) = q_k'(Z_j) - \dfrac{-q_k'(Z_{j-2}) + 16 q_k'(Z_{j-1}) - 30 q_k'(Z_j) + 16 q_k'(Z_{j+1}) - q_k'(Z_{j+2})}{12(\alpha_i \cdot \Delta Z)^2} & \text{(formula 2)} \end{cases}$$

wherein, $\begin{cases} i = 1, 2, \ldots, 6 \\ j = 1, 2, \ldots \end{cases}$;

$Z_j$ represents a sampling point of a depth coordinate Z of the borehole, $\Delta Z$ represents a sampling distance of the depth coordinate Z, and $\Delta Z = Z_{j+1} - Z_j \sim 10$ cm;

$q_k(Z_j)$ represents a content of a k-th radioactive element contained in a unit layer corresponding to the coordinate $Z_j$ of the j-th measurement point, a content corresponding to k=1 is a uranium content, a content corresponding to k=2 is a thorium content, and a content corresponding to k=3 is a potassium content;

$A_{ik}$ represents a conversion factor, when a saturated ore layer is constructed by a unit content of the k-th radioactive element, a count rate at a center point of this saturated ore layer is $A_{ik}$, and the conversion factor is a set of constants obtained by using measured data of standard model wells; and $\alpha_i$ represents a characteristic parameter, the characteristic parameter is an absorption probability of gamma rays in the i-th energy zone being absorbed by strata of unit thickness.

* * * * *